United States Patent [19] [11] 4,302,096
Schonfeld et al. [45] Nov. 24, 1981

[54] GRAPHIC FORMS OVERLAY APPARATUS

[75] Inventors: Arnold Schonfeld, Norristown; Joseph M. Curley, Lansdale, both of Pa.

[73] Assignee: Sperry Corporation, New York, N.Y.

[21] Appl. No.: 120,592

[22] Filed: Feb. 11, 1980

[51] Int. Cl.³ .............................................. G03B 27/52
[52] U.S. Cl. .................................. 355/43; 355/14 R; 355/41; 358/300; 346/108
[58] Field of Search ..................... 355/48–51, 355/66, 3 R, 3 DR, 14 R, 39–43; 346/160, 108; 358/296, 300, 302

[56] References Cited

U.S. PATENT DOCUMENTS

| | | | |
|---|---|---|---|
| 3,598,489 | 8/1971 | Thomas et al. | 355/51 |
| 3,659,936 | 5/1972 | Klose et al. | 355/3 |
| 3,698,006 | 10/1972 | Ovshinsky | 346/160 |
| 3,864,697 | 2/1975 | Dillon et al. | 354/5 |
| 3,922,485 | 11/1975 | Starkweather et al. | 358/285 |
| 3,998,544 | 12/1976 | Pass et al. | 355/48 X |
| 3,999,010 | 12/1976 | Oosaka et al. | 358/302 |
| 4,082,443 | 4/1978 | Draugelis et al. | 355/50 X |
| 4,190,352 | 2/1980 | Bruning | 355/49 X |

Primary Examiner—L. T. Hix
Assistant Examiner—W. J. Brady
Attorney, Agent, or Firm—Robert E. Lee, Jr.; William E. Cleaver; Marshall M. Truex

[57] ABSTRACT

A graphic forms overlay apparatus to be used with non-impact printers requiring the use of a movable light sensitive medium such as laser printers is disclosed. Laser printers use a sweeping laser beam and a movable light sensitive medium to image data from a data processing source for printing. A graphic forms pattern is overlayed on the data imaged on the light sensitive medium for simultaneous printing of the data and pattern. To accomplish this a negative of the pattern is mounted on a hollow rotatable forms drum, and inside the drum a fluorescent tube is fixedly mounted for illuminating the negative. A linear portion of the light image of the negative formed thereby is reflected by an optical system of lenses and mirrors onto adjacent linear portions of the light sensitive medium being swept by the laser beam for imaging of data. Synchronism between rotation of the forms drum and information being written on the movable light sensitive medium is provided by logic circuitry connected between the printer and a stepping motor which is coupled to the forms drum for rotation of the forms drum. A top of page signal from the printer cooperates with the logic circuitry to start synchronous rotation of the forms drum. An alignment signal from an alignment means within the overlay apparatus cooperates with the logic circuitry to stop rotation of the forms drum in an initial position ready for the next top of page signal. Adjustable counter circuitry provides a means for externally varying the rotational speed of the forms drum.

8 Claims, 5 Drawing Figures

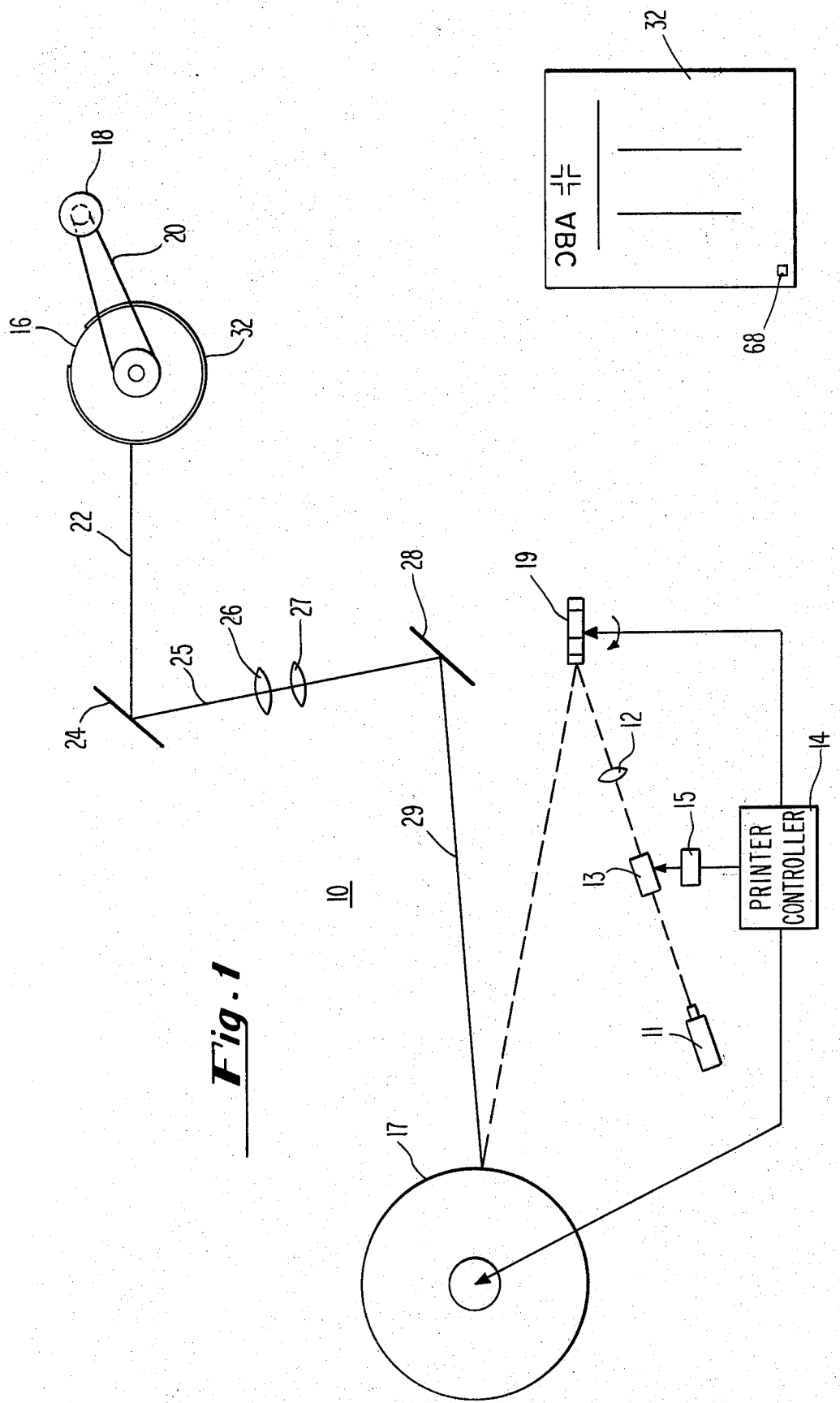

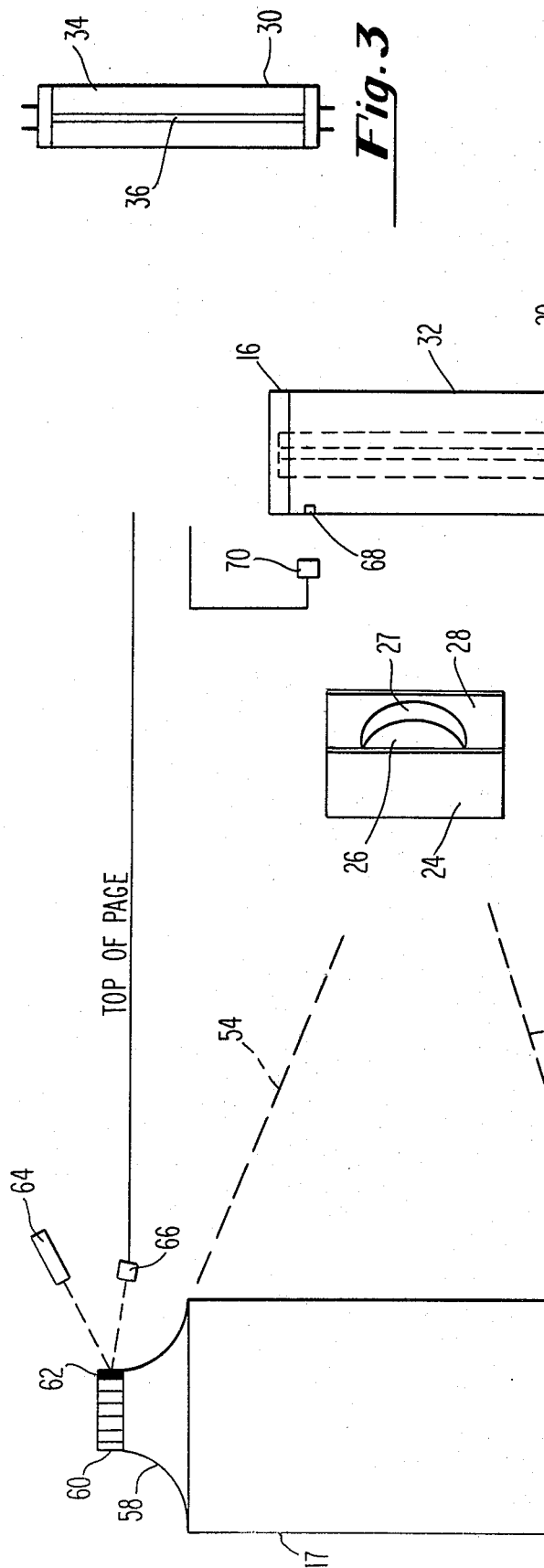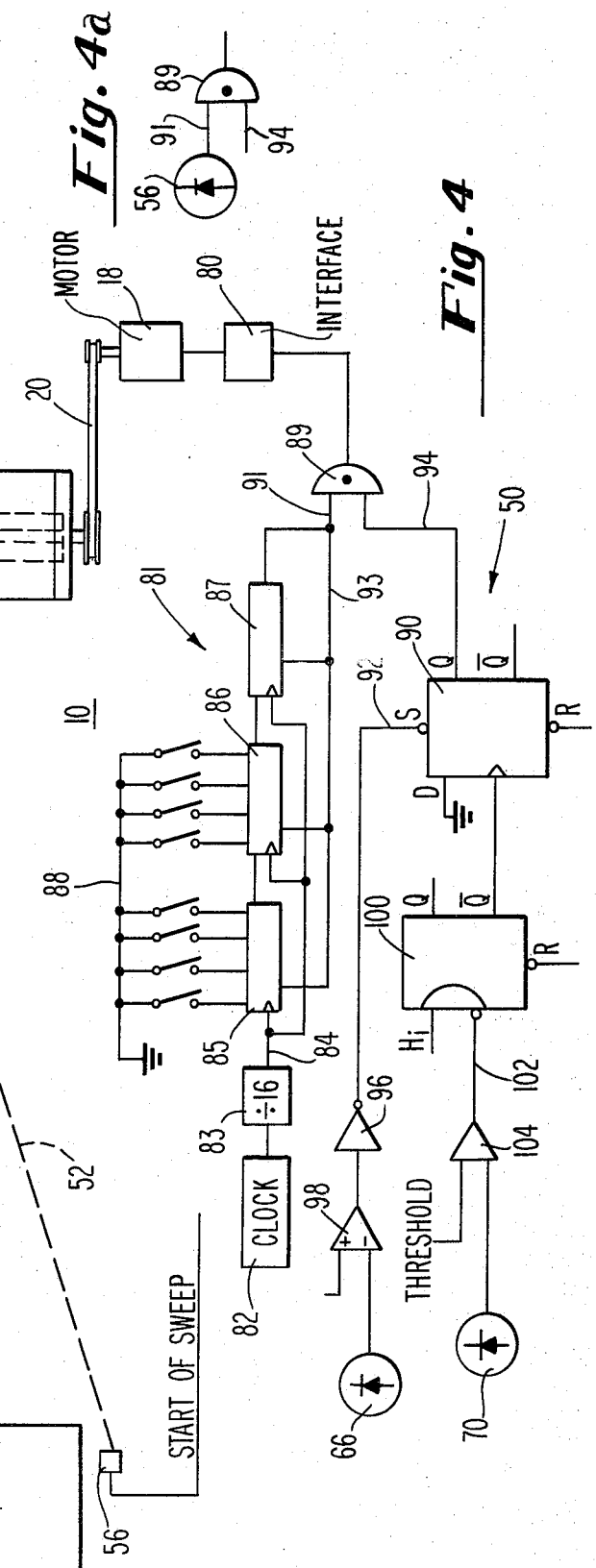

GRAPHIC FORMS OVERLAY APPARATUS

BACKGROUND OF THE INVENTION

This invention relates to an improved graphic forms overlay apparatus for use with non-impact printers whose operation requires imaging on a movable light sensitive medium.

Laser-xerographic printers are one type of non-impact printer well known in the art (see U.S. Pat. Nos. 3,659,936 and 3,698,006). Laser-xerographic printers utilize a modulated beam of laser light which is caused to sweep periodically across a photoconducting drum. The information represented by the modulated light is thereby temporarily stored as electrostatic charges on the surface of the drum. In some laser-xerographic printers, the electrostatic image is developed with toner and the toned image is then transferred to paper to form a permanent record.

It is often desirable to print data such as alphanumeric characters on a government, business or graphic form. Rather than purchase expensive preprinted forms, it is possible to print these forms at the same time that the data is printed. An example of one approach for accomplishing the above using a laser printer is disclosed in U.S. Pat. No. 3,864,697 at column 4, lines 1-14. Another approach used with laser-xerographic printers having cylindrical photoconducting drums comprises a negative of a graphic forms pattern mounted on a hollow, cylindrical rotatable forms drum. The forms drum is equipped with a linear light source fixedly mounted within the hollow forms drum. The photoconducting drum and the forms drum are mechanically coupled so that the forms drum rotates therewith in order to provide synchronous integrated printing of the graphic forms data and information data. Mechanical interconnections can be accomplished by mounting the forms drum above the printer, for example, with the axis of the forms drum parallel to the axis of the photoconducting drum. A belt and pulley is used to connect the ends of the two drums so that when one drum turns the other also turns. As the forms drum rotates, light transmitted through the graphic forms negative causes a light image of a linear portion of the graphic form pattern to be directed onto that linear portion of the photoconducting drum being swept by the laser at that time. Typically, an optical system of lenses and mirrors is used to direct the light images from the forms drum to the photoconducting drum.

When it is desired to retrofit a graphic forms overlay apparatus, like the mechanically coupled forms drum described above, to an existing laser-xerographic printer, it is necessary to mount the forms drum in proper position as described above. For example, the forms drum is mounted above the printer, and the drive belt coupling the two drums is passed through an opening in the top of the printer and around an end of the photoconducting drum.

To insure proper vertical alignment of the graphic forms image with the information data when printed, an indicator means for circumferential alignment of the graphic forms negative on the forms drum must be provided on the forms drum. On some overlay devices, this includes a pair of protrusions on the forms drum lying along a line parallel to the axis of the drum. Graphic forms negatives are made with two spaced apart alignment holes which receive the two protrusions on the forms drum on the graphic forms negative when it is placed on the drum. This method of alignment requires that the holes be placed accurately on the graphic forms negative and that the initial rotational position of the forms drum have a predetermined relationship with the initial position of the photoconducting drum. If the holes in the graphic forms master are not properly positioned from one graphic forms master to the next, or, if the rotational relationship of the two drums is disturbed proper alignment of graphic forms images and information data being printed will be absent.

An alternate known means of providing synchronized rotation between the forms drum and photoconducting drum requires the use of synchronous motors for both drums. The two synchronous motors rotate continuously in phase with one another at the same rate. The synchronous motors may be connected to the drums through gearing arrangments in order to compensate for possible differences in diameter between the two drums. An alignment mark located on the graphic form is detected by a detector once every revolution of the forms drum, and the detector transmits a top-of-forms signal to the printer which starts a page of printing. Hence, the graphic forms image is aligned with the data image from the printer on the photoconducting drum. However, the printer must wait for the signal from the forms drum before printing can be initiated. In some laser-xerographic printers the photoconducting drum is fabricated with a seam running along the surface of the drum parallel to the axis of the drum. No imaging of data can take place along the seam or a small region surrounding the seam. With the alignment procedure described above for synchronous motor drives of the photoconducting and forms drum, care must be taken when selecting and mounting a graphic forms negative on the forms drum so that printing is not started which will result in overlaying of the seam.

SUMMARY

The present invention provides an improved apparatus for overlaying a graphic forms pattern with information data in a single printing operation. The preferred embodiment apparatus includes a rotatable hollow forms drum formed to have a negative of a graphic forms pattern disposed thereon. A light source is fixedly mounted within the forms drum and illuminates a linear portion of the negative to form a light image of a linear portion of the graphic forms pattern. In the preferred embodiment, the light image is reflected through an optical arrangement of mirrors and lenses onto the light sensitive surface of a rotatable conducting drum which is part of a printer system such as a laser-xerographic printer. Also, in the preferred embodiment, one or more top of page marks on the photoconducting drums provide a means for generating top of page signals for use with the printing system.

Alternatively, the light source may be mounted outside the forms drum. The light then passes through the negative to be reflected off the forms drum to form a light image of the negative, a portion of which is reflected onto a suitable movable light sensitive medium.

The forms drum is rotated by a motor means such as a stepping motor or servo motor. A logic circuitry means connected between the printing system and the motor means provides synchronized periodic driving signals to the motor which causes synchronous rotation between the forms drum and the photoconducting drum without the need of mechanical coupling or synchronous motors connected to the drums. The periodic driving signals are generated by the printer controller master clock signals and counter circuitry within the logic circuitry means. The counter circuitry can be adjusted to vary the period of the drive signals to maintain synchronism when a small variation in the forms drum diameter or error in the length of the negative occurs.

A small aperture in the graphic forms negative and a photodetector disposed to receive light from the aperture when the aperture is illuminated by the light source cooperate with the logic circuitry means to provide automatic alignment between the initial rotational position of the forms drum and generation of a top of page signal for the start of printing of a page.

When a top of page signal generated by the printing system is transmitted to the logic circuitry means it allows periodic driving signals generated within the logic circuitry means to drive the motor means for rotation of the forms drum. Rotation of the forms drum will continue until an alignment signal from the photodetector is transmitted to the logic circuitry means at which time after a suitable time interval the periodic driving signals will be blocked from the motor means to thereby stop rotation of the forms drum. Depending on the location of the aperture on the graphic forms negative and the programming of circuitry within the logic circuitry means, the forms drum will be stopped in the initial rotational position for proper alignment with the next top of page signal from the printing system.

It is an advantage of this invention to provide a graphic forms overlay feature for laser printers which does not require mechanical coupling between or synchronous motor drives for the forms drum and the movable light sensitive medium. This will allow for easier assembly of a graphic forms overlay apparatus for use with a laser printing system.

It is a further advantage of this invention that a fixed positional relationship between the forms drum and the movable light sensitive medium is not required for proper vertical alignment of the graphic forms pattern on the information data when printed. The logic circuitry means along with an alignment signal provides for automatic alignment of the initial position of the forms drum and top of page signals from the printing system. Should the alignment aperture within the graphic forms negative be positioned incorrectly the graphic forms negative can be accommodated by adjustments in the parameters of the logic circuitry means.

Another advantage of the invention is that automatic alignment between the forms drum and the top of page signals is accomplished without interfering with the printing by the printer.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is an elevational schematic of a portion of the preferred embodiment graphic forms overlay apparatus and printing system with which it is to be used.

FIG. 2 is a representation of a graphic forms pattern negative for use with the preferred embodiment graphic forms overlay apparatus.

FIG. 3 is a planer view of a portion of the preferred embodiment graphic forms overlay apparatus.

FIG. 4 is a planar schematic of a portion of the graphic forms overlay apparatus and a portion of the printing system with which it is used, along with a circuit schematic portion of the graphic forms overlay apparatus.

FIG. 4a is an alternate embodiment of a portion of the invention of FIG. 4.

DETAILED DESCRIPTION OF THE DRAWINGS

FIG. 1 is an elevational schematic of a graphic forms overlay apparatus designated generally 10 and a laser-xerographic printer. A laser light source 11 transmits a beam of light through acousto-optical modulator 13 which, in the preferred embodiment, comprises a slab of glass with a piezo-electric transducer attached thereto. Digital signals generated by the character generator within the printer controller 14 and representing information data to be printed modulate an RF generator 15. The RF signals are transmitted to the piezo-electric transducer of modulator 13. When an RF signal is present at the transducer, the path of a portion of a laser beam through the modulator 13 is deflected slightly from the normal path traveled through the slab when no RF signal is present. The beam of light emerges from the modulator 13 and passes through a lens 12 which narrows the cross-section of the beam of light. The beam continues onto a rotating polygonal mirror 19. The planar surfaces of the rotating mirror 19 have the effect of sweeping the laser beam in a linear fashion at a periodic rate. The mirror 19 is arranged with respect to the beam of laser light so that impingement of the laser beam upon a photo-conducting drum 17 depends upon the presence of an RF signal at the piezo-electric transducer. More specifically, when an RF signal is present, the laser beam will impinge upon the drum, otherwise it will not.

The photo-conducting drum 17 is cylindrical and stores data as a pattern of electrostatic charges on its surface, the pattern being created in response to illumination by the laser beam. The laser beam moves from left to right along the surface of the drum in a path which is parallel to the axis of the drum. As the drum rotates, the laser sweeps out periodic parallel paths on the drum printing a whole page of data thereon.

In the preferred embodiment, the overlay apparatus comprises a hollow cylindrical forms drum 16 which is rotated by a motor 18. The motor 18 is coupled to forms drum 16 by a belt and pulley arrangement 20. The surface of the forms drum 16 is transparent to light, and a light source such as a cylindrical fluorescent light element 30 in FIG. 3 is fixedly mounted inside forms drum 16. The fluorescent tube 30 does not rotate with the drum 16. A negative of a graphic form such as negative 32 in FIG. 2 is shown mounted on the surface of forms drum 16 in FIG. 1.

FIG. 2 is only a representation of a negative. In an actual negative, the region surrounding both the transparent portion 68 and the forms pattern to be printed would be nontransparent to light, while the transparent portion 68 and forms pattern would be transparent to light.

Referring to FIG. 3, the major portion of the surface of fluorescent tube 30 is non-transparent to light except for linear portion 36. Hence, light radiated from tube 30 is radiated as a linear source of light, thereby illuminating only a linear portion of the negative of the graphic form 32 for a given rotation of the forms drum. This line of light travels over path 22 in FIG. 1 where it is first reflected from mirror 24 along path 25 through lens arrangement 26 and 27 to impinge upon mirror 28. Mirror 28 which is parallel to mirror 24 reflects the beam of light along path 29 to impinge upon a linear portion of photo-conducting drum 17. The arrangement of the drums 17 and 16 as well as the arrangement of the optics comprising mirrors 24 and 28, and lenses 26 and 27 is such that the linear portion of light impinging on photo-conducting drum 17 coincides with the linear sweep of the laser beam. In the preferred embodiment, the cross section of the linear beam of light is approximately one half inch high as it impinges on the drum 17.

A fluorescent tube whose surface is totally transparent to light may also be used. However, the light transmitted will be spread over the entire negative lessening the concentration of light captured by the optical arrangement for reflection onto the photoconducting drum 17.

FIG. 4 is a planar schematic of the graphic forms overlay apparatus 10 showing a schematic of the logic circuitry means designated generally 50. When the laser beam sweeps across photo-conducting drum 17 it sweeps between the dotted lines 52 and 54, in a direction from dotted line 52 to dotted line 54. Each new sweep of the laser beam first begins by impinging on photodetector 56 located to the left of photo-conducting drum 17. This provides a periodic start of sweep signal for use with the laser printer.

Photo-conducting drum 17 further comprises a drive casting 58 connected at one end of the drum 17. Casting 58 ends in a light reflecting end portion 60 shown having a darkened portion 62. The end portion 60 is illuminated by the light source 64, and the reflected light from end portion 60 is detected by photodetector 66. The darkened portion 62 is positioned on end portion 60 in such a way that interruption of the signal from photodetector 60 because of darkened portion 62 signifies the top of page of the next page of data to be printed by the printer.

If more than one page of data is to be imaged on the photoconducting drum, then a corresponding number of darkened portions 62 would be positioned on end portion 60 to provide top of page signals.

Referring to FIGS. 2 and 4, negative 32 comprises a small transparent portion 68. When rotation of the forms drum is such that the portion 68 of negative 32 is aligned with linear portion 36 of tube 30, the light radiated from portion 68 impinges upon photodetector 70. The signal provided by transparent portion 68 cooperates with photodetector 70 to provide an alignment signal for automatic alignment of the initial position of the forms drum 16 with the initial or top of page position of the photoconducting drum 17.

The transparent portion must be disposed in a left or right margin area of the negative, i.e., outside the active area of the negative where a graphic forms pattern may be located. The photodetector 70 must be suitably aligned thereto. Otherwise, light transmitted through the graphic forms pattern may illuminate the photodetector causing a false alignment signal to be generated.

In order that the proper linear portions of graphic form negative 30 are overlayed with the proper lines of data imaged on photoconducting drum 17 by laser 11, it is necessary to align the starting position of forms drum 16 with the top of page signals generated by rotation of the photo-conducting drum 17. Rotation of photo-conducting drum 17 is free running and imaging of a page of data on the photoconducting drum is initiated by a top of page signal. Rotation of forms drum 16 is aligned with the top of page signals by operation of the logic circuitry means 50 in cooperation with the top of page and alignment signals.

In the preferred embodiment drive motor 18 is a stepping motor which increments rotation of forms drum 16 in response to periodically received drive signals. In the preferred embodiment, drive motor 18 is a Superior Electric Motor, model M061-F002, which makes a complete revolution in 200 steps or equivalently provides 1.8 degrees of rotation per step. The drive signals are generated by a motor interface board 80 Model Number STM 103 made by Superior Electric. Designed to receive TTL-like digital input signals, the board provides a drive current which advances in phase each time an input signal is received. Continuous changes in drive current phase cause the motor to rotate in response to the above mentioned input signals.

Periodic digital signals are provided by clock-counter circuitry designated generally 81 of the logic circuitry means 50. The output of a crystal controlled master clock 82 is first divided by sixteen by a counter 83 such as a 74161 TTL device. This provides periodic basic clocking signals over line 84 for driving the remaining counter circuitry comprising 74161 counters 85, 86 and 87. Counters 85 and 86 can be loaded externally with any of a range of preset counts via switching means 88. In the preferred embodiment, a fixed preset count is loaded into counter 87. By adjusting the preset count loaded into counters 85 and 86, the separation between digital signals transmitted from clock-counter circuitry 81 to the interface board 80 via AND gate 89 can be varied thereby changing the rate at which motor 18 and drum 16 turns. Hence, the clock-counter circuitry 81 provides a means for compensating for variations in the diameter of forms drum 16 or in the length of negative 32 which variations would effect proper rotational synchronism between drums 16 and 17.

After a count of M basic clock signals by counters 85, 86 and 87, a digital signal is transmitted to AND gate 89 over line 91 and is also fed back over line 93 to load counters 85, 86 and 87 with their respective preset counts, so that the count can begin over.

It is not necessary that the periodic digital signals to AND gate 89 be generated by clock-counter circuitry 81. Alternatively, referring to FIG. 4a, periodic start of sweep signals from photodetector 56 can be connected directly to AND gate 89 to serve as the digital signals for the interface board 80. In addition, other periodic signals or derivations thereof related to the sweeping rate of the laser across the photoconducting drum can be utilized to provide digital signals to AND gate 89. However, in the preferred embodiment, the clock-counter circuitry 81 is utilized to provide an adjustment means for compensating for variations in forms drum diameter and errors in negative fabrication, etc.

Rotation by stepping motor 18 begins when a top of page signal from photodetector 66 sets D flip flop 90 over line 92. The output of D flip flop 90 is connected to AND gate 89 via line 94. A high signal to AND gate 89 from flip flop 90 gates the digital signals on line 91 to stepping motor 18. The output of flip flop 90 will be set to the high state when the set input S over line 92 is low. The current from photodetector 66 stops when darkened position 62 interrupts the reflected light from end portion 60. The output of photodetector 66 is transmitted to the negative side of differential amplifier 98, which is an LM 3900 device. When the current to the negative side stops, differential amplifier 98 provides a high signal output. This high signal is inverted by inverter 96 to provide a low signal over line 92 to set flip flop 90. Then, periodic drive signals can pass through AND gate 89 to motor 18 via interface board 80 as long as the output on line 94 is high.

When photodetector 70 is activated by light from aperture portion 68 from the graphic forms negative, a signal is provided to single shot multi-vibrator 100 by amplifier 104. The single shot multi-vibrator 100 is a 74LS221 TTL device. A low signal output pulse from multi-vibrator 100 provides a delayed clocking input to D flip flop 90. D flip flop 90 has a low signal on the D line and this is transferred to the output of flip flop 90 on the positive going or trailing edge of the low multi-vibrator output pulse. This low signal on line 94 blocks AND gate 89 from passing drive signals to stepping motor 18.

In a well known manner, the output pulse width of multi-vibrator 100 can be varied externally with suitable selection of resistance and capacitance connected to selected pin connections of the multi-vibrator 100. This in turn varies the time at which the trailing edge of the multi-vibrator output pulse is inputted to D flip flop 90. Hence, the time interval between the arrival of the signal from photodetector 70 to multi-vibrator 100 and the transmitting of a low signal from D flip flop 90 on line 94 can be varied.

The position of transparent portion 68 at the end of negative 32 and the length of the time interval described above cooperate to stop rotation of the forms drum 16 in the initial position where graphic forms images are properly overlayed on the photoconducting drum with the start of the next page of data triggered by a top of page signal. In general, it may be necessary to rotate forms drum 16 several more steps after the alignment signal is generated in order to accomplish this.

In the preferred embodiment, two pages of data are imaged on the photoconducting drum 17 for each full rotation of the drum 17. The forms drum 16 rotates one full rotation for each page of data imaged on drum 17 in order to overlay a graphic form on one page of data on the photo-conducting drum. In general, the circumferential distance of the forms drum 16 is less than the circumferential distance from the top of one page of data to the top of the next page of data on the photoconducting drum 17. Through cooperation of the alignment means and logic circuitry means described above, the rotation of the forms drum 16 can be stopped in the initial position after a full rotation and then started again with the next top of page signal. It is desirable to stop rotation of the forms drum on an opaque portion of the negative after transmission of the alignment signal in order to prevent constant illumination of photoconducting drum 17.

Adjustment of the parameters of multi-vibrator 100 provides a means for correcting an error in locating the transparent portion 68 on the negative.

While the present invention has been disclosed in connection with the preferred embodiment thereof, it should be understood that there may be other embodiments which fall within the spirit and scope of the invention as defined by the following claims.

What is claimed is:

1. An apparatus to be used with a light sensitive, movable printing member of a printing system to enable said printing member to print a graphic forms pattern and information data in a single operation and which printing system includes printer circuitry means to generate first control signals, including top of page signals, said apparatus comprising:
    movable forms drum for mounting a graphic forms negative thereon;
    light source to illuminate said negative to produce a positive light image thereof;
    optical means for reflecting at least a linear portion of said positive light image onto said light sensitive printing member;
    motor means connected to said forms drum for rotating said forms drum;
    logic circuitry means connected between said printer circuitry means and said motor means for activating said motor means to rotate said forms drum synchronously with said movable printing member, said logic circuitry means cooperating with each of said top of page signals to start rotation of said forms drum when printing of a page of data begins by said printing system; and
    an alignment means connected to said logic circuitry means for generating and transmitting an alignment signal to said logic circuitry means, said alignment signal cooperating with said logic circuitry means to stop rotation of said forms drum in a predetermined position when said printing of said page is finished, whereby said graphic forms pattern is properly aligned with said data when said printing begins with the next top of page signal.

2. The invention of claim 1 wherein said forms drum is hollow and said light source is mounted inside said forms drum.

3. The invention of claim 2 wherein said alignment means comprises an alignment transparent portion in said graphic forms master and a photodetector, said photodetector connected to said logic circuitry means and disposed to receive light from said alignment transparent portion of said graphic forms master when said alignment transparent portion is rotated into position between said photodetector and said light source by said motor means.

4. The invention of claim 3 wherein said motor means rotates said forms drum in response to periodically occurring digital signals generated by said logic circuitry means.

5. The invention of claim 3 wherein said first control signals comprise periodic start of sweep signals and wherein said motor means comprises a stepping motor which rotates said forms drum in response to said periodic start of sweep signals.

6. The invention of claim 3 wherein said logic circuitry means comprises input circuitry for receiving said alignment signals; and
    a single shot multi-vibrator connected to said input circuitry, said single shot multi-vibrator having externally variable parameters for controlling the output pulse width of said single shot multi-vibrator; and wherein the position of said alignment transparent portion in said graphic forms master cooperates with the setting of said externally variable parameters of said single shot multi-vibrator to define said predetermined position.

7. The invention of claim 4 wherein said logic circuitry means comprises speed means for adjusting the speed of rotation of said motor means whereby variations in the diameter of said forms drum and the length of said negative can be compensated for.

8. The invention of claim 7 wherein said first control signals comprise clocking signals;

said logic circuitry means comprises counter circuitry for counting said clocking signals and transmitting periodically occurring drive signals after attaining a predetermined count; and switching means connected to a portion of said counter circuitry for changing said predetermined count.

* * * * *